United States Patent
Huh et al.

(10) Patent No.: US 7,754,118 B2
(45) Date of Patent: Jul. 13, 2010

(54) POLISHING PAD CONTAINING EMBEDDED LIQUID MICROELEMENTS AND METHOD OF MANUFACTURING THE SAME

(76) Inventors: Hyun Huh, 7-1204 Jinheung Apartment, 1315 Seocho-dong, Seocho-gu, Seoul, 137-070 (KR); Sang-Mok Lee, 104-201 Woojung Sunkyung Apartment, 385 Woojung-dong, Chung-gu, Ulsan, 681-250 (KR); Kee-Cheon Song, 302-1101 Dongbu Apart,ment, 789-6 Yaum-2-dong, Nam-gu, Ulsan, 680-042 (KR); Seung-geun Kim, 407 KOREA POLYOL Residence, 699-2 Yaum-3-dong, Nam-gu, Ulsan, 680-043 (KR); Do-Kwon Son, 479-20 Changjun-2-dong, Kumjung-gu, Busan, 609-392 (KR)

(*) Notice: Subject to any disclaimer, the term of this patent is extended or adjusted under 35 U.S.C. 154(b) by 107 days.

(21) Appl. No.: 11/350,951

(22) Filed: Feb. 10, 2006

(65) Prior Publication Data

US 2006/0125133 A1    Jun. 15, 2006

Related U.S. Application Data

(62) Division of application No. 10/647,297, filed on Aug. 26, 2003, now Pat. No. 7,579,071.

(30) Foreign Application Priority Data

Sep. 17, 2002 (KR) .................. 10-2002-0056480
Dec. 9, 2002 (KR) .................. 10-2002-0077893

(51) Int. Cl.
*B29C 71/00* (2006.01)
(52) U.S. Cl. .................. 264/41; 264/45.1
(58) Field of Classification Search .................. 264/41
See application file for complete search history.

(56) References Cited

U.S. PATENT DOCUMENTS

| 5,578,362 | A   |   | 11/1996 | Reinhardt et al. |        |
|-----------|-----|---|---------|------------------|--------|
| 5,611,826 | A   | * | 3/1997  | Ryoke et al.     | 51/295 |
| 5,876,266 | A   |   | 3/1999  | Miller et al.    |        |
| 5,893,796 | A   |   | 4/1999  | Birang et al.    |        |
| 5,958,794 | A   |   | 9/1999  | Bruxvoort et al. |        |
| 6,069,080 | A   |   | 5/2000  | James et al.     |        |
| 6,171,181 | B1  |   | 1/2001  | Roberts et al.   |        |
| 6,267,644 | B1  |   | 7/2001  | Molnar           |        |
| 6,364,744 | B1  |   | 4/2002  | Merchant et al.  |        |
| 7,029,747 | B2  |   | 4/2006  | Huh et al.       |        |

FOREIGN PATENT DOCUMENTS

| KR | 2001-0002696 | 1/2001 |
|----|--------------|--------|
| KR | 2001-0055791 | 7/2001 |

\* cited by examiner

*Primary Examiner*—Monica A Huson
(74) *Attorney, Agent, or Firm*—John K. Park; Park Law Firm

(57) ABSTRACT

A polishing pad is provided. The polishing pad includes a polishing layer composed of a polymeric matrix and liquid microelements embedded in the polymeric matrix. Open pores defined by the embedded liquid microelements are distributed across a surface of the polishing layer. Due to the microstructural open pores uniformly distributed across a surface of the polishing pad, a polishing operation can be performed at high precision. The polishing pad shows constant polishing performance during the polishing operation, can be stably used, and does not cause a wafer to be scratched. In addition, a method of manufacturing the polishing pad is provided. Since all components used to manufacture the polishing pad are in a liquid phase, manufacturing can be easily performed.

13 Claims, 7 Drawing Sheets

POLISHING PAD CONTAINING EMBEDDED LIQUID MICROELEMENTS AND METHOD OF MANUFACTURING THE SAME

PRIORITY INFORMATION

This application is a divisional of U.S. application Ser. No. 10/647,297, filed on Aug. 26, 2003, now U.S. Pat. No. 7,579,071, the entire contents of which are hereby incorporated by reference and for which priority is claimed under 35 U.S.C. & 120; and this application claims priority of Application No. 10-2002-0056480 filed in Republic of Korea on Sep. 17, 2002 and Application No. 10-2002-0077893 filed in Republic of Korea on Dec. 9, 2002 under 35 U.S.C. §119.

BACKGROUND OF THE INVENTION

1. Field of the Invention

The present invention relates to a polishing pad and a method of manufacturing the same, and more particularly, to a polishing pad containing embedded liquid microelements and a method of manufacturing the same.

2. Description of the Related Art

Chemical mechanical planarization/polishing (CMP) process has been used for global planarization of semiconductor devices and has become important with tendencies to an increase in the diameter of a wafer, a high integration density, a micro line width, and a multilayer wiring structure.

In a CMP process, under a state in which the surface of a wafer to be processed is in contact with a polishing pad due to a predetermined down pressure applied to the wafer, the wafer and the polishing pad are moved relative to one another while a polishing slurry is supplied to the contact therebetween so that physical abrasion is provoked by abrasive particles contained in the polishing slurry and the protrusions of the polishing pad, and simultaneously chemical abrasion is provoked by chemical components within the polishing slurry. The performance of such CMP process is estimated from a polishing speed and the flatness of a wafer and depends on the conditions of CMP equipment, the performance of a polishing slurry, and the performance of a polishing pad.

In particular, it is necessary that a polishing pad's surface directly contacting a wafer is saturated with a polishing slurry so that the polishing slurry flows smoothly. Polishing pads, which include a polymeric matrix impregnated with a plurality of hollow polymeric microelements and/or micro hollow polymeric bundles having a fine-textured structure to collect and supply a polishing slurry for the purpose of allowing the polishing slurry to flow efficiently, are disclosed in U.S. Pat. No. 5,578,362 and Korean Patent Publication Nos. 2001-2696 and 2001-55971.

However, the polishing pad disclosed in U.S. Pat. No. 5,578,362 includes two elements having different hardness, i.e., a polymeric matrix and hollow polymeric microelements, on its surface. Due to a difference in hardness, the polishing pad's surface has different supporting forces against a friction pressure during a polishing operation, which results in a difference in the amount of abrasion on the polishing pad's surface. This difference in abrasion leads to non-uniform supply and distribution of a polishing slurry, which may result in non-uniform polishing on a wafer. Moreover, the polymeric microelements existing on the polishing pad's surface have high hardness, which may cause the surface of the wafer to be scratched during the polishing operation. A material in a powder state having a low specific gravity is used for the polymeric microelements. Accordingly, when mixing the powder with a material for the polymeric matrix by agitating them, the power has poor workability. In addition, non-uniform dispersion of powder results in non-uniform distribution of pores in a manufactured pad. Then, a polishing slurry cannot be uniformly carried, so polishing uniformity across a wafer is decreased. A lump of power that is not appropriately dispersed may damage the surface of a wafer. A polishing pad including hollow polymeric microelements and micro hollow polymeric bundle particles, disclosed in Korean Patent Publication No. 2001-55971, also has these problems.

In the meantime, a polishing pad disclosed in Korean Patent Publication No. 2001-2696 includes only micro hollow polymeric bundle particles having an average diameter of 0.4-2 μm, so the amount of a collected polishing slurry is small. A small amount of a polishing slurry decreases a polishing speed. The same problem occurs in a polishing pad mainly including micro hollow polymeric bundles, which is disclosed in Korean Patent Publication No. 2001-55971.

It is important to accurately and quickly measure the flatness of a wafer during a polishing operation. In U.S. Pat. Nos. 5,893,796 and 6,171,181, polishing pads suitable for optically measuring the flatness of a wafer in situ are disclosed. However, in a polishing pad disclosed in U.S. Pat. No. 5,893,796, a transparent plug is inserted into a pad in order to form a transparent window capable of transmitting a light beam. For this, manufacturing processes of forming an aperture in the pad and fixing the transparent plug in the aperture with an adhesive are additionally required. In U.S. Pat. No. 6,171,181, a transparent region is formed in a pad by more quickly solidifying a predetermined region than any other region in a mold. This requires a special mold in which temperature can be differently adjusted depending on portions, and therefore, manufacturing cost is increased.

SUMMARY OF THE INVENTION

The present invention provides a polishing pad, which allows a polishing slurry to be collected and supplied uniformly, polishing uniformity to be achieved, and the flatness of an object being polished to be measured in situ without using a separate transparent window, does not allow the surface of the object to be scratched, and is manufactured easily.

The present invention also provides a method of manufacturing a polishing pad, which allows a polishing slurry to be collected and supplied uniformly, polishing uniformity to be achieved, and the flatness of an object being polishing to be measured in situ without using a separate transparent window and does not allow the surface of the object to be scratched.

According to one aspect of the present invention, there is provided a polishing pad including a polishing layer composed of a polymeric matrix and liquid microelements embedded in the polymeric matrix. Open pores defined by the embedded liquid microelements are distributed across a surface of the polishing layer.

According to a further aspect of the present invention, there is provided a method of manufacturing a polishing pad. In this method, a material for a polymeric matrix is mixed with a liquid material. Subsequently, gelling and curing of the mixture is performed, thereby forming a polishing layer including the polymeric matrix, liquid microelements embedded in the polymeric matrix, and pores defined by the embedded liquid microelements at its surface. Thereafter, the polishing layer is processed to form a polishing pad.

The details of preferred embodiments of the present invention are included in the detailed description and the attached drawings. Since the polishing pad includes microstructural open pores, a polishing slurry is uniformly collected and supplied so that a polishing operation can be performed at high precision. In addition, since the open pores are continuously provided during the polishing operation, the polishing performance of the polishing pad is maintained constant. Since the polishing pad has a composition allowing uniform abrasion, an object being polished is also uniformly polished. The polishing pad does not have a high-hardness polymer on its surface, so it can eliminate a probability of occurrence of scratches on a wafer due to a polymer. Since the polishing pad is semitransparent, the flatness of the polished object can be optically measured in situ during the polishing operation without forming a separate portion transmitting light in the polishing pad. In addition, all components used to manufacture the polishing pad are in a liquid phase, so manufacturing processes can be easily performed.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
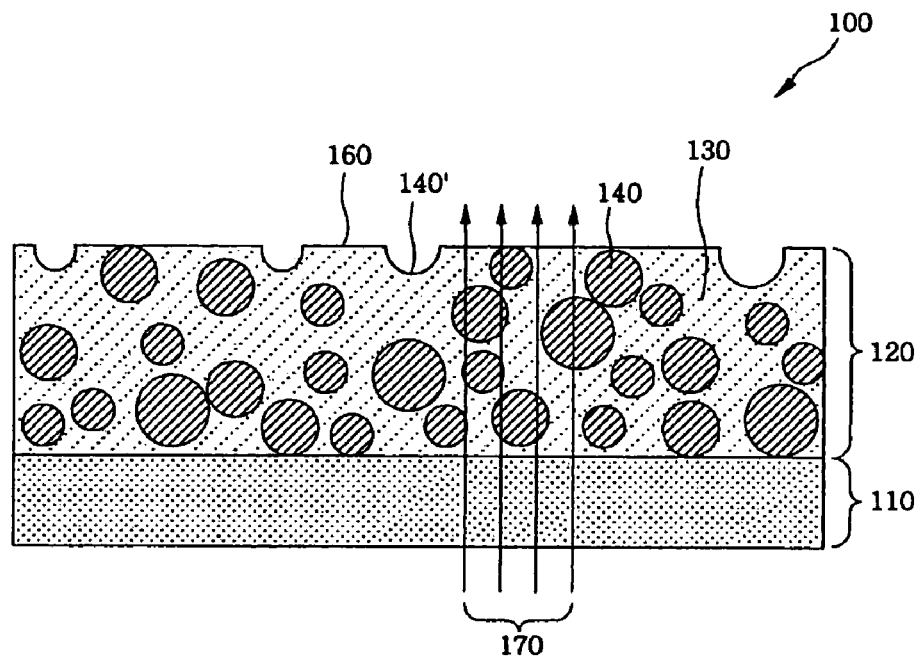
FIG. 1 is a cross-section of a polishing pad containing embedded liquid microelements according to a first embodiment of the present invention.

Hereinafter, preferred embodiments of the present invention will be described in detail with reference to the attached drawings. However, this invention may be embodied in many different forms and should not be construed as being limited to the embodiments set forth herein; rather, these embodiments are provided so that this disclosure will be thorough and complete, and will fully convey the concept of the invention to those skilled in the art. The scope of the present invention is defined by the appended claims. The thickness of a support layer and a polishing layer and the size and the shape of liquid microelements are exaggerated and simplified for clarity. In the drawings, the same reference numerals denote the same element.

Figure 2:
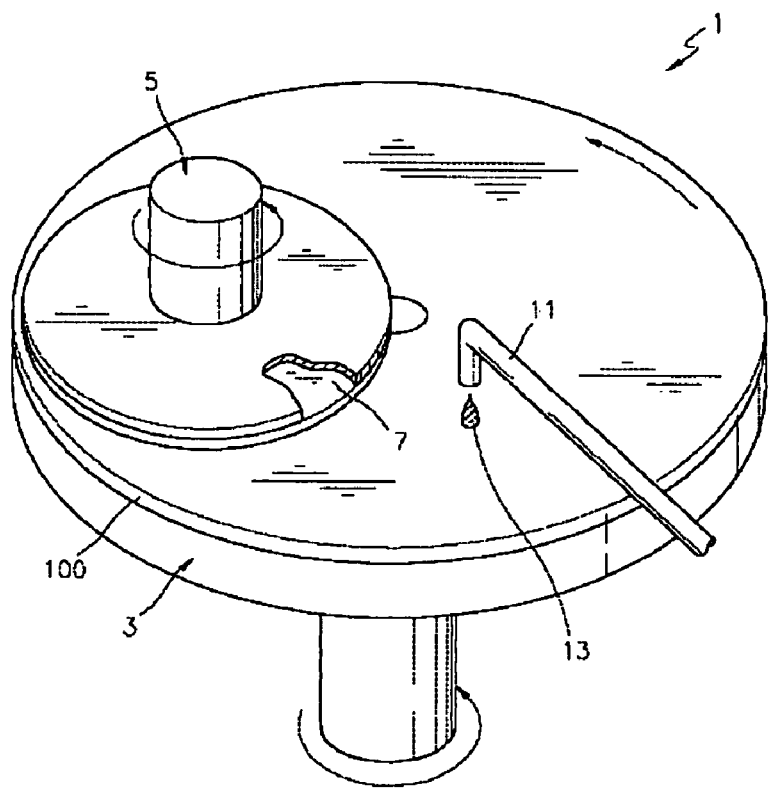
FIG. 2 is a schematic diagram of a polishing apparatus employing a polishing pad.

FIG. 1 is a cross-section of a polishing pad 100 according to a first embodiment of the present invention. FIG. 2 is a schematic diagram of a polishing apparatus 1 employing the polishing pad 100 according to the first embodiment of the present invention. The polishing pad 100 has a circular shape to be fit into the rotary polishing apparatus 1 in FIG. 2 but can have various shapes such as a rectangle and a square depending on the shape of a polishing apparatus.

The polishing pad 100 according to the first embodiment of the present invention includes a support layer 110 and a polishing layer 120. The support layer 110 is used to fix the polishing pad 100 to a platen 3, as shown in FIG. 2. The support layer 110 is made from a material having dynamic stability in order to correspond to a force pressing a silicon wafer 7, i.e., an object being polished, which is loaded at a head 5 facing the platen 3 so that the support layer 110 supports the polishing layer 120 with uniform elasticity with respect to the silicon wafer 7. Accordingly, the support layer 110 is made from a nonporous, solid, and uniform elastic material mainly and has lower hardness than the polishing layer 120. In addition, at least a part of the support layer 110 is transparent or semitransparent so that a light beam 170 used to detect the flatness of a surface of the object being polished can be transmitted through the support layer 110. In FIG. 2, the object being polished is the silicon wafer 7 having a metal or insulation layer as a layer being polished. However, various types of substrates such as a substrate, on which a thin film transistor-liquid crystal display (TFT-LCD) is to be formed, a glass substrate, a ceramic substrate, and a polymer plastic substrate can be objects being polished. In addition, the polishing pad 100 can be manufactured without including the support layer 110.

As shown in FIG. 2, the polishing layer 120 directly contacts the silicon wafer 7. The polishing layer 120 is composed of a polymeric matrix 130 and embedded liquid microelements 140 uniformly distributed within the polymeric matrix 130. A plurality of pores 140', which have an open microstructure and are defined by the embedded liquid microelements 140, are uniformly arranged on a polishing layer surface 160, which directly contacts the silicon wafer 7. The polishing layer 120 forms a nonuniform system composed of the polymeric matrix 130 and the embedded liquid microelements 140. This nonuniform system is semitransparent with respect to the light beam 170 used to optically detect the surface state, i.e., flatness, of the silicon wafer 7, i.e., an object being polished. Accordingly, the polishing pad 100 is composed of the support layer 110, which is at least partially transparent or semitransparent, and the polishing layer 120, which is entirely semitransparent. Therefore, when using the polishing pad 100, it is easy to optically detect the flatness of a surface of an object being polished in situ during a polishing operation.

Preferably, the polymeric matrix 130 is made from a material, which does not dissolve in a polishing slurry, i.e., a chemical solvent used for planarization. For example, as shown in FIG. 2, the polymeric matrix 130 is made from a material into which the polishing slurry 13 supplied through a nozzle 11 of the polishing apparatus 1 cannot infiltrate. In addition, it is preferable that the polymeric matrix 130 is made from a material on which casting and extrusion can be performed. Accordingly, the polymeric matrix 130 is made from a material selected from the group consisting of polyurethane, polyether, polyester, polysulfone, polyacryl, polycarbonate, polyethylene, polymethylmethacrylate, polyvinylacetate, polyvinylchloride, polyethyleneimine, polyethersulfone, polyetherimide, polyketone, melamine, nylon, hydrocarbon fluoride, and a combination thereof. It is preferable that the polymeric matrix 130 is made from polyurethane, which is obtained from low-viscosity two-liquid type urethane composed of an isocyanate prepolymer and a hardener. The prepolymer is a precursor of a final polymer and includes an oligomer or monomer. The isocyanate prepolymer contains average at least two isocyanate functional groups and 4-16 weight percent of reactive isocyanate and is obtained from the reaction between polyol, such as polyether, polyester, or polytetramethylene glycol, and toluene diisocyanate or methylene dephenyl diisocyanate. The isocyanate prepolymer reacts with a hardener having an isocyanate-reactive group, thereby finally forming polyurethane. Amine, such as 4,4-methylene-bis (2-chloroaniline) (referred to as MOCA), or polyether or polyester polyol can be used as a curing agent. The property of polyurethane can be adjusted by combining ingredients in various ways.

The plurality of pores 140' arranged on the polishing layer surface 160 and the embedded liquid microelements 140 are provided to increase polishing uniformity by enabling a polishing slurry to be smoothly collected and supplied. More specifically, as shown in FIG. 2, when the polishing slurry 13 is supplied to a contact between the silicon wafer 7 and the polishing pad 100 through the nozzle 11 in the polishing apparatus, the plurality of pores 140' arranged on the polishing layer surface 160 serve to collect the polishing slurry 13 and uniformly supply it across the surface of the silicon wafer 7. Thereafter, when polishing is continuously performed while the silicon wafer 7 and the polishing pad 100 are moved relative to each other, the polishing layer surface 160 is partially worn away or ground, exposing the embedded liquid microelements 140. The exposed embedded liquid microelements 140 form pores 140' serving to collect and supply the polishing slurry 13. Accordingly, it is preferable that the pores 140' arranged on the polishing layer surface 160 and the embedded liquid microelements 140 are uniformly distributed in the polymeric matrix 130.

The embedded liquid microelements 140 are formed using a liquid material, which is incompatible with the polymeric matrix 130, i.e., a material selected from the group consisting of aliphatic mineral oil, aromatic mineral oil, silicon oil without a hydroxyl group in a molecule, soybean oil, coconut oil, palm oil, cotton seed oil, camellia oil, hardened oil, and a combination thereof. The liquid material preferably has a molecular weight of 200-5000 and more preferably has a molecular weight of 200-1000. When the liquid material has a molecular weight of 200 or less, the liquid material leaks during curing, so the concentration of the embedded liquid microelements 140 within the polymeric matrix 130 decreases. Conversely, when the liquid material has a molecular weight of 5000 or greater, it is difficult to mix the liquid material with a material for the polymeric matrix 130 due to a high viscosity, so it is difficult to uniformly form the embedded liquid microelements 140.

Preferably, the embedded liquid microelements 140 are dispersively formed in a micro spherical shape within the polymeric matrix 130. The diameter of spheres is preferably in a range of 5-60 μm and more preferably in a range of 10-30 μm. The diameter in the range of 10-30 μm is most optimal to the collection and supply of a polishing slurry. However, the diameter of spheres can be changed depending on a type of polishing slurry, and the size of the embedded liquid microelements 140 can be also changed.

The size of the embedded liquid microelements 140, i.e., the diameter of spheres, can be easily and variously adjusted by adjusting a weight ratio of a liquid material for the embedded liquid microelements 140 to a material for the polymeric matrix 130. Preferably, 20-50 weight percent of, and more preferably, 30-40 weight percent of a liquid material, based on the total weight of polyurethane for the polymeric matrix 130, is used to obtain the desired size of the embedded liquid microelements 140. When the content of the liquid material is less than 20 weight percent, the size of the embedded liquid microelements 140 increases, and consequently, the size of the pores 140' formed on the polishing layer surface 160 also increases. In this case, a removal rate increases due to an increase of a collected polishing slurry in the pores, but it is difficult to perform precise polishing. In addition, if the polishing slurry contains nonuniform large particles, the large particles of the polishing slurry are collected, so scratches occur on the wafer surface. Conversely, when the content of the liquid material exceeds 50 weight percent, the size of the embedded liquid microelements 140 decreases, and consequently, the size of the pores 140' formed on the polishing layer surface 160 also decreases. In this case, precise polishing can be performed due to a small amount of collected particles of the polishing slurry. In addition, large particles of the polishing slurry are not collected so that the number of scratches on the wafer is reduced. However, a large amount of the liquid material leaks during the manufacture of the polishing pad 100 so it is difficult to handle the polishing pad 100. Moreover, a polishing speed decreases.

The size of the embedded liquid microelements 140 can be easily and variously adjusted by adjusting the amount of a dispersing agent. It is preferable that the content of the dispersing agent is 1-5 weight percent, based on the total weight of polyurethane for the polymeric matrix 130. When the content of the dispersing agent is less than 1 weight percent, the dispersive ability for a liquid material decreases, and thus the liquid material is not uniformly mixed with material for the polymeric matrix 130. When the content of the dispersing agent exceeds 5 weight percent, the surface tension of a reaction system decreases, so micro gas within the reaction system expands due to the heat of reaction, and to thus form pin holes in the polishing pad 100. Preferably, the dispersing agent is a surfactant, for example, an anionic surfactant such as higher alcohol sulfuric acid ester salt, higher alkyl ether sulfuric acid ester salt, sodium alkyl benzene sulfonate, α-olefin sulfonic, acid salt, or phosphate ester salt; a higher alkylamine type or quaternary ammonium type cationic surfactant; an amino acid type or betaine type amphoteric surfactant; siloxane-oxyalkylene copolymer, polyoxyethylene, polyoxyethylene-polyoxypropylene copolymer, glycerine fatty acid ester, sugar ester, sorbitol fatty acid ester, or a combination thereof.

In other words, since the size of the embedded liquid microelements 140 and the size of the pores 140' defined by the embedded liquid microelements 140 can be variously adjusted by adjusting the amount of the liquid material and/or the amount of the dispersing agent, polishing pads having various performance can be manufactured depending on a type of object being polished and/or a type of polishing slurry.

Preferably, a structure or pattern including a flow channel is further provided on the polishing layer surface 160 in order to facilitate delivery of a polishing slurry.

As described above, in the case of the polishing pad 100 according to the first embodiment of the present invention, the concentration of the liquid material or a surfactant is adjusted in order to adjust the size of the pores 140'. As the concentration of the liquid material increases, the dispersive ability of the surfactant decreases, and thus the liquid material is not uniformly mixed with the polymeric matrix 130. In addition, after a curing process, the liquid material may leak. In the meantime, the surfactant used to disperse the liquid material during manufacturing of the polishing pad 100 reacts with an isocyanate prepolymer, and thus deteriorates the mechanical properties of the polishing pad 100. In addition, the number of ingredients of the polishing pad 100 is increased due to use of the surfactant, so that the number of devices in a manufacturing machine increases. Accordingly, hereinafter, a polishing pad, which can be manufactured without using a surfactant, according to a second embodiment of the present invention will be described.

Figure 3:
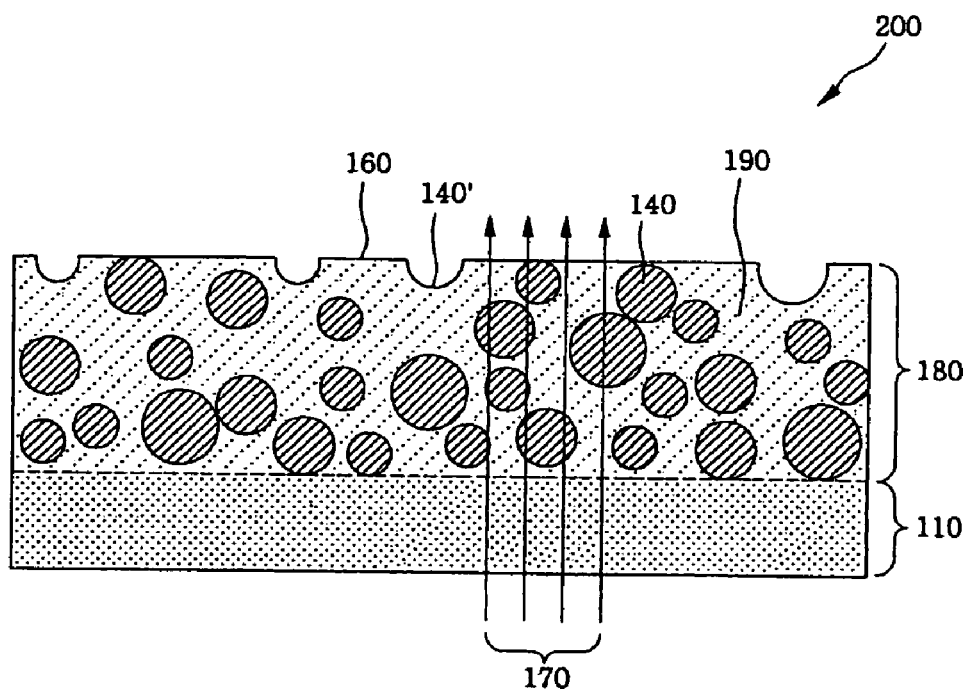
FIG. 3 is a cross-section of a polishing pad using a hydrophilic polymeric matrix and containing embedded liquid microelements, according to a second embodiment of the present invention.

FIG. 3 is a cross-section of a polishing pad 200 according to the second embodiment of the present invention. The polishing pad 200 may have various shapes, such as a circle, a rectangle, and a square, depending on the shape of a polishing apparatus.

The polishing pad 200 according to the second embodiment of the present invention includes a support layer 110 and a polishing layer 180, which are made from chemically compatible materials with each other, thereby forming an integrated pad in which a structural border does not exist between two layers (a dotted line in FIG. 3 denotes a virtual border). That the polishing layer 180 and the support layer 110 are chemically compatible with each other and thus integrated means that the materials of the two layers are uniformly mixed by melting or solution at the interface between the two layers because the materials have the same chemical structure, the materials have functional groups allowing physical interaction within their chemical structures, or there is a compatibilizer even if the materials are chemically different, and the mixture of the materials of the two layers gels and is hardened to have a single phase. Accordingly, a special material such as an adhesive for connecting the two layers or a process of bonding the tow layers is not required.

The support layer 110 is used to fix the polishing pad 200 to the platen 3 shown in FIG. 2. The support layer 110 is made from a material having dynamic stability in order to correspond to a force pressing the silicon wafer 7, i.e., an object being polished, which is loaded at the head 5 facing the platen 3 so that the support layer 110 supports the polishing layer 180 with uniform elasticity with respect to the silicon wafer 7. Accordingly, the support layer 110 is made from a nonporous, solid, and uniform elastic material mainly and has lower hardness than the polishing layer 180. In addition, at least a part of the support layer 110 is transparent or semitransparent so that the light beam 170 used to detect the flatness of a surface of the object being polished can be transmitted through the support layer 110. In FIG. 2, the object being polished is the silicon wafer 7 having a metal or insulation layer as a layer being polished. However, various types of substrates such as a substrate, on which a TFT-LCD is to be formed, a glass substrate, a ceramic substrate, and a polymer plastic substrate can be objects being polished. In addition, the polishing pad 200 can be manufactured without including the support layer 110.

As shown in FIG. 2, the polishing layer 180 directly contacts the silicon wafer 7 and preferably has higher hardness than the support layer 110 in order to increase planarization efficiency. The polishing layer 180 is composed of a polymeric matrix 190 containing a hydrophilic compound (hereinafter, referred to as a hydrophilic polymeric matrix 190) and embedded liquid microelements 140 uniformly distributed within the hydrophilic polymeric matrix 190. A plurality of pores 140', which have an open microstructure and are defined by the embedded liquid microelements 140, are uniformly arranged on a polishing layer surface 160, which directly contacts the silicon wafer 7. The polishing layer 180 forms a nonuniform system composed of the hydrophilic polymeric matrix 190 and the embedded liquid microelements 140. This nonuniform system is semitransparent with respect to the light beam 170 used to optically detect the surface state, i.e., flatness, of the silicon wafer 7, i.e., an object being polished. Accordingly, the polishing pad 200 is composed of the support layer 110, which is at least partially transparent or semitransparent, and the polishing layer 180, which is entirely semitransparent. Therefore, when using the polishing pad 200, it is easy to optically detect the flatness of a surface of an object being polished in situ during a polishing operation. In addition, during the polishing operation, the polishing pad 200 is worn away, continuously exposing the embedded liquid microelements 140 on the polishing layer surface 160. The exposed embedded liquid microelements 140 are replaced by a polishing slurry. Accordingly, only the hydrophilic polymeric matrix 190 exists at the polishing layer surface 160, so the polishing pad 200 is prevented from being nonuniformly worn away, and the silicon wafer 7 can be uniformly polished.

Preferably, the hydrophilic polymeric matrix 190 is made from a material, which does not dissolve in a polishing slurry, i.e., a chemical solvent used for planarization. For example, as shown in FIG. 2, the hydrophilic polymeric matrix 190 is made from a material into which the polishing slurry 13 supplied through the nozzle 11 of the polishing apparatus 1 cannot infiltrate. In addition, it is preferable that the hydrophilic polymeric matrix 190 is made from a material on which casting and extrusion can be performed. Accordingly, the hydrophilic polymeric matrix 190 is made by chemically or physically combining a hydrophilic compound with a material selected from the group consisting of polyurethane, polyether, polyester, polysulfone, polyacryl, polycarbonate, polyethylene, polymethylmethacrylate, polyvinyl acetate, polyvinyl chloride, polyethyleneimine, polyethersulfone, polyetherimide, polyketone, melamine, nylon, hydrocarbon fluoride, and a combination thereof. Here, the hydrophilic compound may be polyethylene glycol, polyethylenepropylene glycol, polyoxyethylene alkylphenolether, polyoxyethylene alkylether, polyethylene glycol fatty acid ester, polyoxyethylene alkylamine ether, glycerine fatty acid ester, sugar ester, sorbitol fatty acid ester, or a combination thereof. It is preferable that the hydrophilic compound is polyethylene glycol.

It is preferable that the hydrophilic polymeric matrix 190 is made from polyurethane containing the hydrophilic compound. Polyurethane is made from the reaction between an isocyanate prepolymer and a curing agent having an isocyanate-reactive group. Amine, such as 4,4-methylene-bis (2-chloroaniline) (MOCA), or polyether or polyester polyol can be used as the curing agent. The isocyanate prepolymer contains an average of at least two isocyanate functional groups and 4-16 weight percent of reactive isocyanate and is obtained from the reaction between polyol such as polyether, polyester, or polytetramethylene glycol and toluene diisocyanate or methylene dephenyl diisocyanate. The hydrophilic polymeric matrix 190 is made by incorporating polyethylene glycol, i.e., the hydrophilic compound, into the isocyanate prepolymer or mixing polyethylene glycol with a curing agent or other component.

The plurality of pores 140' arranged on the polishing layer surface 160 and the embedded liquid microelements 140 are provided in order to increase polishing uniformity by enabling a polishing slurry to be smoothly collected and supplied. Accordingly, it is preferable that the pores 140' arranged on the polishing layer surface 160 and the embedded liquid microelements 140 are uniformly distributed in the hydrophilic polymeric matrix 190. The embedded liquid microelements 140 are formed using a liquid material, which is incompatible with the hydrophilic polymeric matrix 190. The liquid material may be aliphatic mineral oil, aromatic mineral oil, silicon oil without a hydroxyl group in a molecule, soybean oil, coconut oil, palm oil, cotton seed oil, camellia oil, hardened oil or a combination thereof.

Preferably, the embedded liquid microelements 140 are dispersively formed in a micro spherical shape within the hydrophilic polymeric matrix 190. The average diameter of spheres is preferably in a range of 1-30 μm and more preferably in a range of 2-10 μm. The diameter in the range of 2-10 μm is most optimal to the collection and supply of a polishing slurry. However, the diameter of spheres can be changed depending on a type of polishing slurry, and the size of the embedded liquid microelements 140 is also changed.

The form of the embedded liquid microelements 140, i.e., the average diameter and the concentration of spheres, can be easily and variously adjusted by adjusting the hydrophilicity of the hydrophilic polymeric matrix 190. In other words, by using preferably 1-20 and more preferably 5-10 weight percent of polyethylene glycol, based on the total weight of the isocyanate prepolymer, a desired form of the embedded liquid microelements 140 can be obtained. When the content of polyethylene glycol is less than 1 weight percent, there is no change in the hydrophilicity of the hydrophilic polymeric matrix 190, and thus the form of the embedded liquid microelements 140 does not change. With an increase in the content of polyethylene glycol, the hydrophilicity of the hydrophilic polymeric matrix 190 increases. Accordingly, the size of the embedded liquid microelements 140 decreases and the concentration thereof increases. However, when the content of polyethylene glycol exceeds 20 weight percent, the hydrophilicity does not increase any more, and thus the form of the embedded liquid microelements 140 does not change. The molecular weight of polyethylene glycol is preferably in a range of 200-10000 and more preferably in a range of 400-1000. When the molecular weight of polyethylene glycol is less than 200, a surface-activating ability decreases, so that the liquid material does not uniformly dispersed within the hydrophilic polymeric matrix 190. When the molecular weight of polyethylene glycol exceeds 10000, polyethylene glycol is in a solid phase, which is not easy to handle. When the content and the molecular weight of polyethylene glycol are in the above described ranges, the form of the embedded liquid microelements 140 can be most easily adjusted. However, the content of polyethylene glycol can be changed depending on the composition of the isocyanate prepolymer and a type of the liquid material. The form of the embedded liquid microelements 140 can also be changed depending on the composition of the isocyanate prepolymer and a type of the liquid material.

The form of the embedded liquid microelements 140 can also be easily and variously adjusted by adjusting the weight percent of a liquid material for the embedded liquid microelements 140. Preferably, 20-50 weight percent of, and more preferably, 30-40 weight percent of the liquid material, based on the total weight of polyurethane for the hydrophilic polymeric matrix 190, is used to obtain the desired form of the embedded liquid microelements 140. When the content of the liquid material is less than 20 weight percent, the size of the embedded liquid microelements 140 increases. Consequently, the size of the pores 140' formed on the polishing layer surface 160 also increases. In this case, a polishing speed increases due to an increase in the amount of collected polishing slurry, but it is difficult to perform precise polishing. In addition, if the polishing slurry contains nonuniform large particles, the large particles of the polishing slurry are collected, and therefore, a wafer can be scratched. Conversely, when the content of the liquid material exceeds 50 weight percent, the concentration of the embedded liquid microelements 140 increases, causing the embedded liquid microelements 140 to be combined with each other. Consequently, the size of the pores 140' increases.

In other words, the sizes and concentrations of the embedded liquid microelements 140 and the pores 140' defined by the embedded liquid microelements 140 can be variously adjusted by adjusting the hydrophilicity of the hydrophilic polymeric matrix 190 and/or the content of the liquid material, thereby manufacturing polishing pads having various polishing performances in accordance with a type of object being polished and/or a type of polishing slurry.

Preferably, a structure or pattern including a flow channel is further provided on the polishing layer surface 160 in order to facilitate delivery of polishing slurry.

Figure 4:
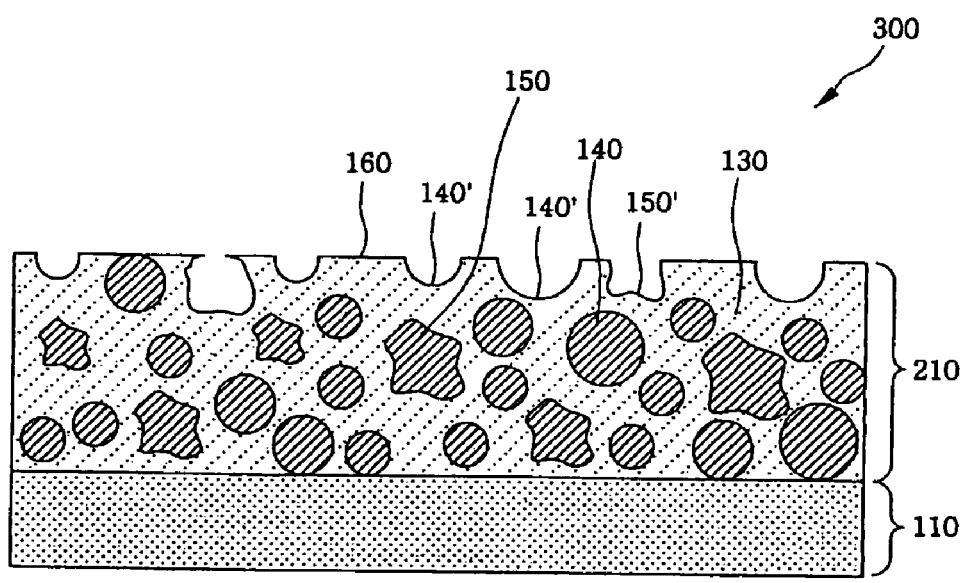
FIG. 4 is a cross-section of a polishing pad containing embedded liquid micro elements and hollow polymeric microelements, according to a third embodiment of the present invention.

FIG. 4 is a cross-section of a polishing pad 300 according to a third embodiment of the present invention. The polishing layer 210 in the third embodiment is different from the polishing layers 120 and 180 in the respective first and second embodiments in that it contains hollow polymeric microelements 150 together with embedded liquid microelements 140. By further containing the hollow polymeric microelements 150, pores 140' defined by the embedded liquid microelements 140 and pores 150' defined by the hollow polymeric microelements 150 are provided on a polishing layer surface 160. Accordingly, various types of pores having various sizes can be provided, thereby varying the polishing performance of the polishing pad 300.

The hollow polymeric microelements 150 may be formed of mineral salt, sugar, water-soluble gum, or resin. Polyvinyl alcohol, pectin, polyvinyl pyrrolidone, hydroxyethyl cellulose, methyl cellulose, hydropropylmethyl cellulose, carboxymethyl cellulose, hydroxypropyl cellulose, polyacrylic acid, polyacrylamide, polyethylene glycol, polyhydroxyether acrylate, starch, maleic acid copolymer, polyurethane, or a combination thereof maybe used as a hollow polymer for the hollow polymeric microelements 150. These materials and equivalents can be made using any method widely known in the art.

Preferably, the total content of the liquid material for the embedded liquid microelements 140 and the hollow polymer is 10-30 weight percent, based on the total weight of a material for the polymeric matrix 130 or the hydrophilic polymeric matrix 190. Preferably, a ratio of the weight of the liquid material to the weight of the hollow polymer is at least 8. When the ratio is lower than 8, a wafer can be scratched by the hollow polymer.

Figure 5:
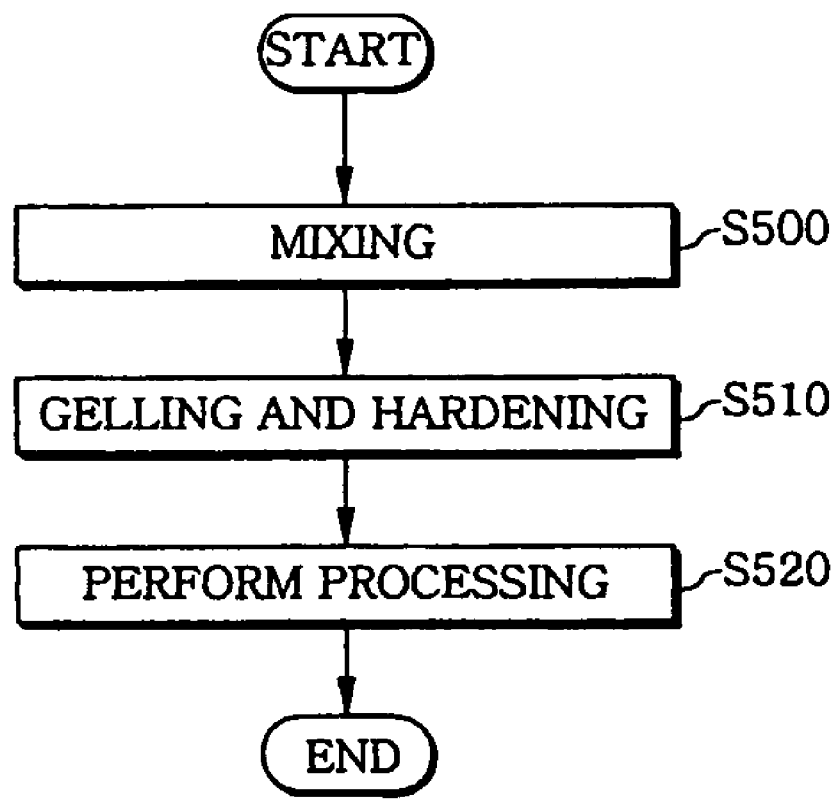
FIG. 5 is a flowchart of a method of manufacturing a polishing pad containing embedded liquid microelements according to the present invention.

Hereinafter, a method of manufacturing a polishing layer of a polishing pad will be described with reference to FIG. 5. The types and the contents of materials constituting the polishing layer have been described above, and thus detailed descriptions thereof will be omitted.

Materials for forming the polishing layer are mixed in step S500. More specifically, a liquid material is mixed with materials for a polymeric matrix or a hydrophilic polymeric matrix according to the above described composition. When mixing them, a dispersing agent may be used to uniformly disperse the liquid material within the material for the polymeric matrix or the material for the hydrophilic polymeric matrix. It is preferable to use an agitation method for dispersion and mixing. When necessary, a hollow polymer can also be mixed with these materials.

Thereafter, gelling and curing are carried but in step S510. The mixture is injected into a mold having a predetermined shape and then solidified through gelling and curing. Gelling is performed for 5-30 minutes at 80-90° C., and curing is performed for 20-24 hours at 80-120'. However, processing temperature and time can be variously changed to provide optimal conditions.

Next, the cured product is processed in step S520. The cured product is processed through demolding, cutting, surface treatment, and cleaning. First, the cured product is taken out of the mold and cut to have a predetermined thickness and shape. It is apparent that the polishing layer can be formed in the shape of sheet using any method, such as casting or extrusion, known in the field of polymer sheet manufacturing in order to increase the productivity. It is preferable to form grooves in various shapes on a surface of the polishing layer so that a polishing slurry can be uniformly supplied across the working surface of the polishing layer. After a cleaning process, manufacture of the polishing layer is completed. During the cleaning, embedded liquid microelements exposed on the surface of the polishing layer flow out, and thus open pores are formed on the surface of the polishing layer. Here, it is preferable to use a liquid cleanser to remove the liquid microelements from the surface of the polishing layer.

A polishing pad can be constituted only by the polishing layer. However, when necessary, a support layer can be made using a method widely known in the field of polishing pad manufacturing and is combined with the polishing layer to complete a polishing pad.

The more details of the present invention will be described by explaining specific experimental examples. Details not described below are omitted because they can be technically inferred by those skilled in the art. It will be apparent that the scope of the present invention is not limited to the following experimental examples.

Experimental Example 1

Figure 6:
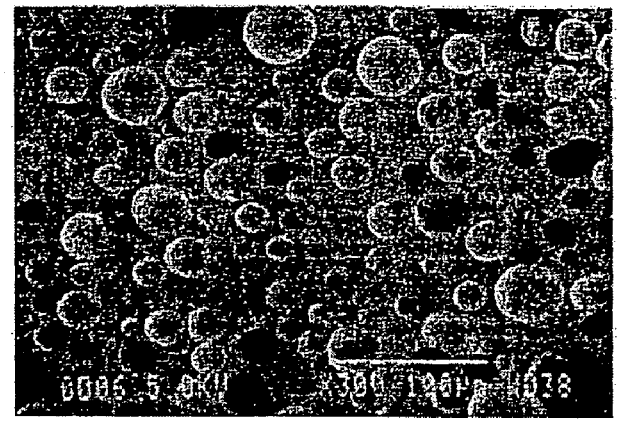
FIG. 6 is a scanning electron microscope (SEM) photograph of a surface of a polishing pad containing 35 weight percent of a liquid material, based on the total weight of a material for a polymeric matrix.

100 g of a polyether-based isocyanate prepolymer (having an NCO content of 11%), 46 g of mineral oil (hereinafter, referred to as KF-70 (Seojin Chemical)), 5 g of nonylphenol ethoxylate (hereinafter, referred to as NP-2 (Korea Polyol)), and 33 g of MOCA were mixed at room temperature and then immediately poured into a mold. Then, gelling was performed for 30 minutes, and thereafter, curing was performed in an oven for 20 hours at 100° C. The cured product was taken out of the mold and cut to form a polishing layer of a polishing pad. A scanning electron microscope (SEM) photograph of a surface of the resultant polishing layer is shown in FIG. 6. It was detected from FIG. 6 that open pores having an average diameter of 10-30 μm existed on the surface of the polishing layer.

Figure 7:
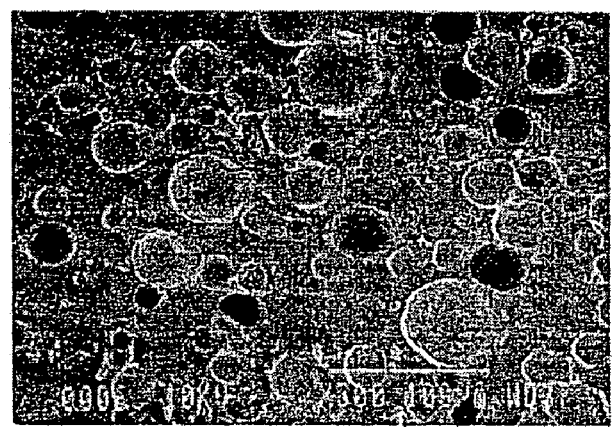
FIG. 7 is a SEM photograph of a surface of a conventional polishing pad containing hollow polymeric microelements.

As a comparison example, according to a method of manufacturing a polishing pad disclosed in U.S. Pat. No. 5,578,362, a polishing layer was manufactured using 100 g of a polyether-based isocyanate prepolymer (having an NCO content of 11%), 2.4 g of EXPANCEL hollow polymeric microelements, and 33 g of MOCA. A SEM photograph of the manufactured polishing layer is shown in FIG. 7. It was detected from FIG. 7 that the polishing layer manufactured by the conventional method has larger pores with a diameter of 30-50 μm than the polishing layer manufactured according to the present invention. In addition, it can be seen from FIG. 7 that the microelements of the conventional polishing layer have a rougher and less uniform surface than those of the polishing layer according to the present invention.

Experimental Example 2

Figure 8:
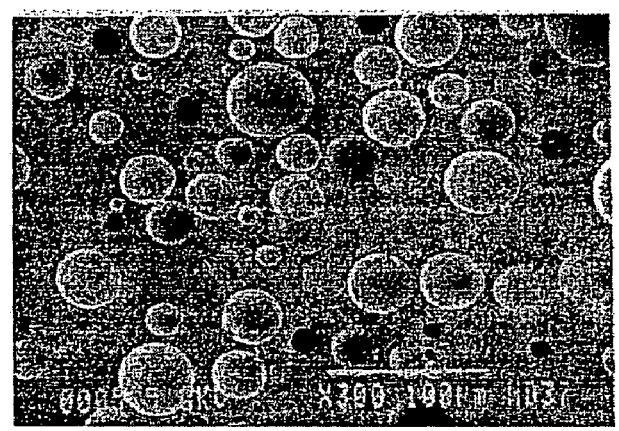
FIG. 8 is a SEM photograph of a surface of a polishing pad containing 30 weight percent of a liquid material, based on the total weight of a material for a polymeric matrix.

A polishing layer of a polishing pad was manufactured in the same manner as used in Experimental Example 1, with the exception that 40 g of KF-70 was used. A SEM photograph of the resultant polishing layer is shown in FIG. 8. It was detected from FIG. 8 that open pores having an average diameter of 30-40 μm existed on a surface of the polishing layer.

Experimental Example 3

Figure 9:
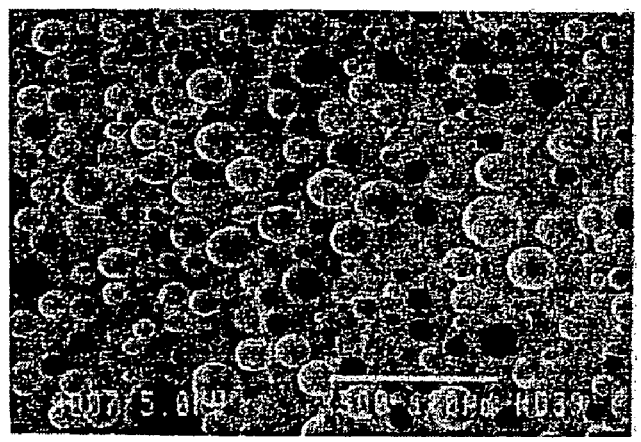
FIG. 9 is a SEM photograph of a surface of a polishing pad containing 40 weight percent of a liquid material, based on the total weight of a material for a polymeric matrix.

A polishing layer of a polishing pad was manufactured in the same manner as used in Experimental Example 1, with the exception that 53 g of KF-70 was used. A SEM photograph of the resultant polishing layer is shown in FIG. 9. It was detected from FIG. 9 that open pores having an average diameter of 5-15 μm existed on a surface of the polishing layer.

Experimental Example 4

Figure 10:
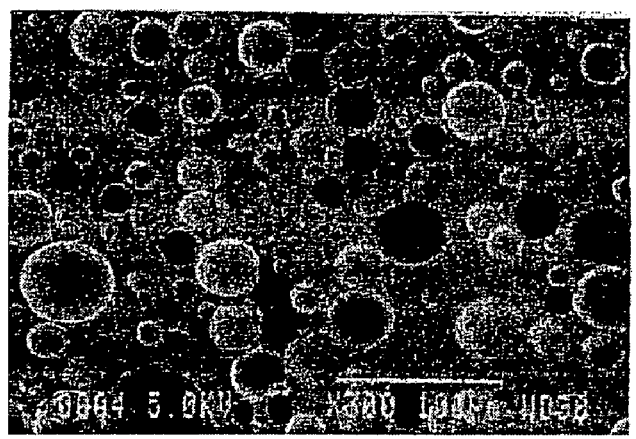
FIG. 10 is a SEM photograph of a surface of a polishing pad, in which the ratio of the weight of a liquid material to the weight of a hollow polymer is 46.

100 g of a polyether-based isocyanate prepolymer (having an NCO content of 11%), 33 g of KF-70, and 6 g of NP-2 were mixed. 0.7 g of EXPANCEL 091 DE polymeric microelements having a diameter of 30-130 μm was uniformly dispersed in the mixture using a Homo mixer for 2 minutes at 2000 rpm. The mixture was then mixed with 33 g of MOCA at room temperature and immediately poured into a mold. Thereafter, gelling was performed for 30 minutes, and thereafter, curing was performed in an oven for 20 hours at 100° C. The cured product was taken out of the mold and cut, thereby forming a polishing layer of a polishing pad. A SEM photograph of a surface of the resultant polishing layer is shown in FIG. 10. It was detected from FIG. 10 that open pores having an average diameter of 30-50 μm existed on the surface of the polishing layer. In comparison with FIG. 6 showing the polishing layer manufactured using the mineral oil and FIG. 7 showing the polishing layer manufactured using the EXPANCEL hollow polymer, it can be seen that large pores formed by EXPANCEL and small pores formed by mineral oil exist together on the surface of the polishing layer shown in FIG. 10.

Experimental Example 5

Figure 11:
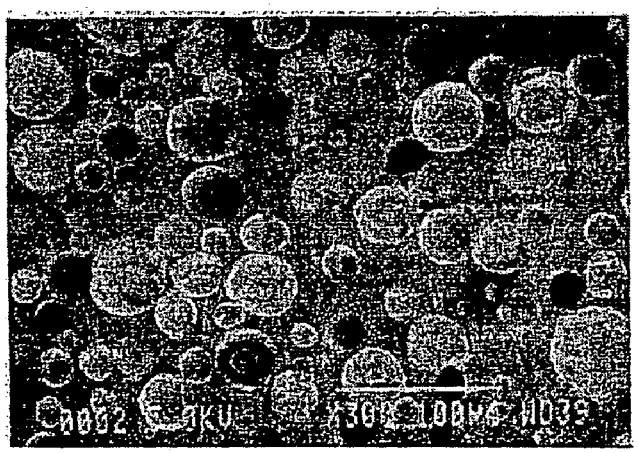
FIG. 11 is a SEM photograph of a surface of a polishing pad, in which the ratio of the weight of a liquid material to the weight of a hollow polymer is 8.

A polishing layer of a polishing pad was manufactured in the same manner as used in Experimental Example 4, with the exception that 1.7 g of EXPANCEL and 14 g of KF-70 were used. A SEM photograph of the resultant polishing layer is shown in FIG. 11. It is detected from FIG. 11 that large pores defined by EXPANCEL exist more on a surface of the polishing layer in Experimental Example 5 than in Experimental Example 4.

Experimental Example 6

100 g of polytetramethylene glycol (having a molecular weigh of 1000) and 52 g of toluendiisocyanate were put into a 2-liter 4-neck flask so as to react for 4-5 hours at 70-80° C. The NCO content of a final product was 11.0%. The viscosity of the manufactured isocyanate prepolymer was 8000 cPs (25° C.).

Experimental Example 7

95 g of polytetramethylene glycol (having a molecular weigh of 1000), 5 g of polyethylene glycol (having a molecular weigh of 400), and 53.7 g of toluendiisocyanate were put into a 2-liter 4-neck flask so as to react for 4-5 hours at 70-80° C. The NCO content of a final product was 11.0%. The viscosity of the manufactured isocyanate prepolymer was 7000 cPs (25° C.).

Experimental Example 8

90 g of polytetramethylene glycol (having a molecular weigh of 1000) and 10 g of polyethylene glycol (having a molecular weigh of 1000), and 52 g of toluendiisocyanate were put into a 2-liter 4-neck flask so as to react for 4-5 hours at 70-80° C. The NCO content of a final product was 11.0%. The viscosity of the manufactured isocyanate prepolymer was 6200 cPs (25° C.).

Experimental Example 9

85 g of polytetramethylene glycol (having a molecular weigh of 1000) and 15 g of polyethylene glycol (having a molecular weigh of 1500), and 50.9 g of toluendiisocyanate were put into a 2-liter 4-neck flask so as to react for 4-5 hours at 70-80° C. The NCO content of a final product was 11.0%. The viscosity of the manufactured isocyanate prepolymer was 5600 cPs (25° C.).

Experimental Example 10

Figure 12:
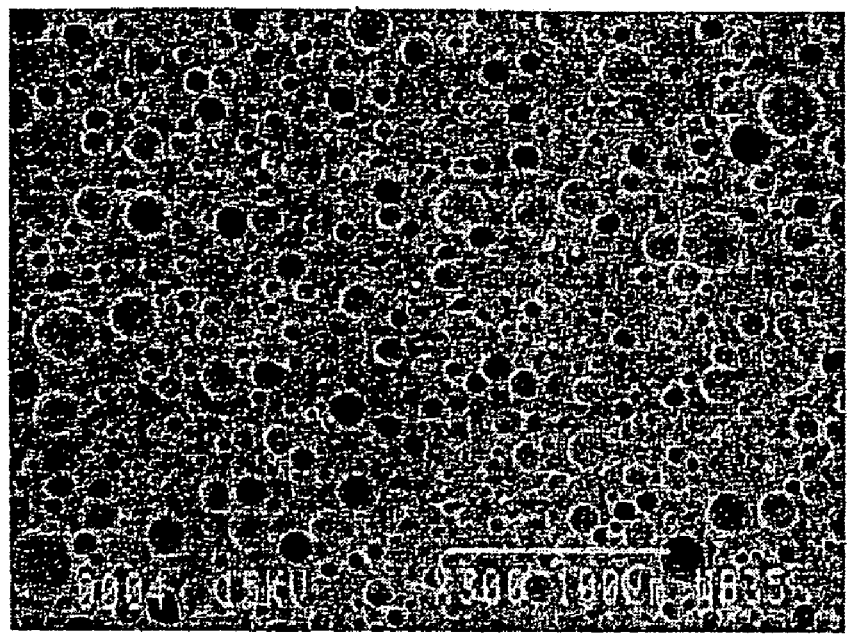
FIG. 12 is a SEM photograph of a surface of a polishing pad using a hydrophilic polymeric matrix.

100 g of isocyanate prepolymer manufactured in Experimental Example 8 was uniformly mixed with 46 g of KF-70 using a mechanical agitator and then put on a vacuum oven for 10 minutes at a temperature of 80° C. and a pressure of 10 torr so that bubbles were removed from the mixture and the temperature of the mixture became 80° C. 33 g of MOCA, which had been previously adjusted to a temperature is of 80° C., was mixed with the mixture for 30 seconds at a rate of 3000 rpm using a mechanical agitator and then immediately poured into a mold. Then, gelling was performed for 30 minutes, and thereafter, curing was performed in an oven for 20 hours at 100° C. The cured product was taken out of the mold and cut to form a polishing layer of a polishing pad. A SEM photograph of the polishing layer is shown in FIG. 12. The polishing layer had a contact angle of 70 degrees, and open pores having an average diameter of 4-6 µm existed on a surface of the polishing layer. The concentration of the pores was about 50-60/0.01 mm².

The polishing layer shown in FIG. 6, which was manufactured using 100 g of isocyanate prepolymer (having an NCO content of 11%), 46 g of KF-70, and 33 g of MOCA in Experimental Example 1, had a contact angle of 78 degrees. Accordingly, it can be inferred that by using the isocyanate prepolymer containing polyethylene glycol, which was manufactured in Experimental Example 8, the hydrophilicity of a polishing pad can be increased. It was detected from FIGS. 6 and 12 that the polishing layer manufactured in Experimental Example 1 contained pores having a larger average diameter of 20-30 µm and a lower concentration of 10-20/0.01 mm² than the pores contained in the polishing layer manufactured in Experimental Example 10.

Experimental Example 11

Figure 13:
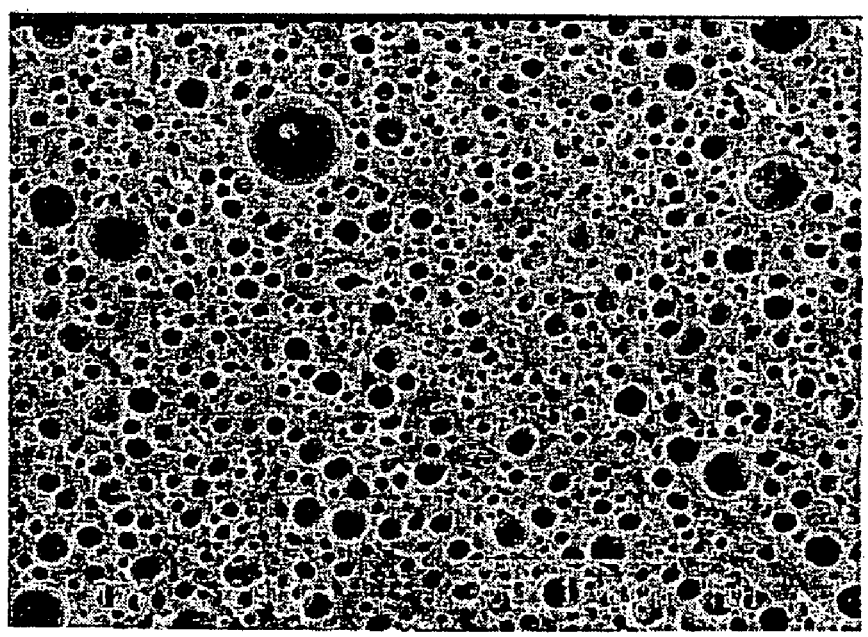
FIG. 13 is a SEM photograph of a surface of a polishing pad containing 40 weight percent of a liquid material, based on the total weight of a material for a hydrophilic polymeric matrix.

A polishing layer of a polishing pad was manufactured in the same manner as used in Experimental Example 10, with the exception that 53 g or KF-70 was used. A SEM photograph of the polishing layer is shown in FIG. 13. It was detected from FIG. 13 that the polishing layer had open pores having an average diameter of 2-4 µm on its surface. The concentration of the pores was about 90-100/0.01 mm².

Experimental Example 12

Figure 14:
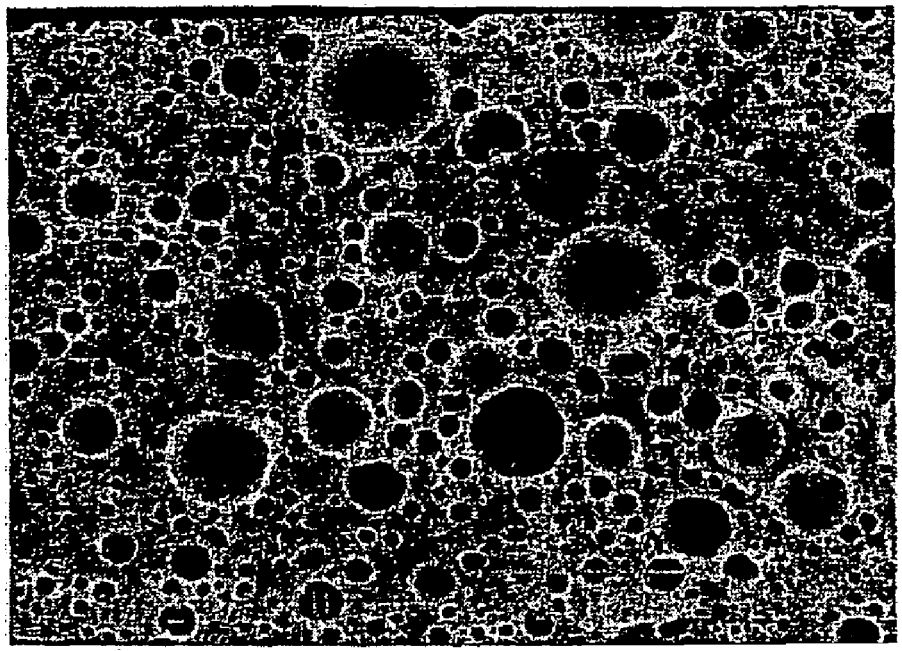
FIG. 14 is a SEM photograph of a surface of a polishing pad containing 45 weight percent of a liquid material, based on the total weight of a material for a hydrophilic polymeric matrix.

A polishing layer of a polishing pad was manufactured in the same manner as used in Experimental Example 10, with the exception that 60 g of KF-70 was used. A SEM photograph of the polishing layer is shown in FIG. 14. It was detected from FIG. 14 that the polishing layer had open pores having an average diameter of 5-6 µm on its surface. The concentration of the pores was about 55-65/0.01 mm².

Experimental Example 13

Figure 15:
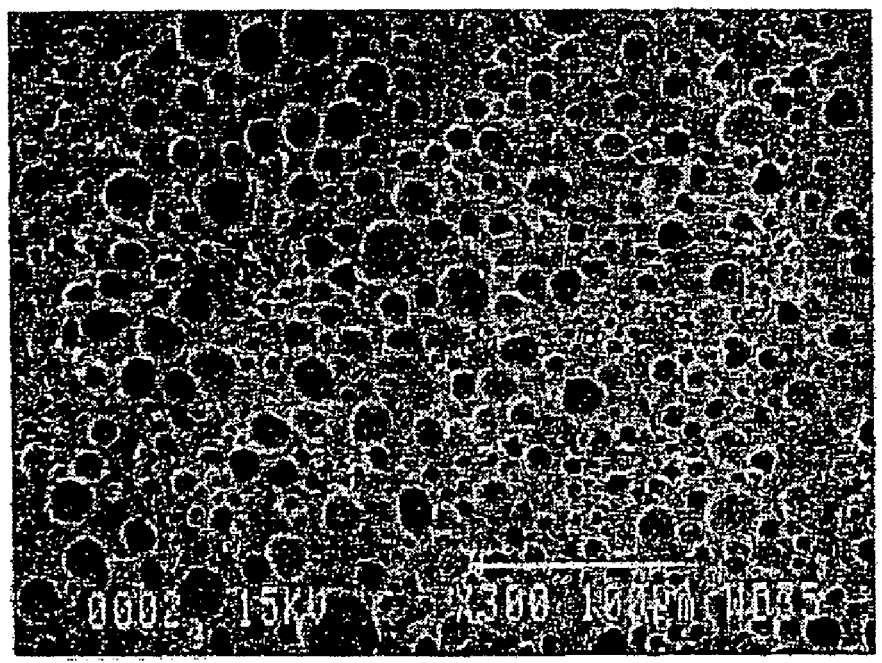
FIG. 15 is a SEM photograph of a surface of a polishing pad containing 10 weight percent of hydrophilic compound, based on the total weight of an isocyanate prepolymer contained in a material for a polymeric matrix.

90 g of isocyanate prepolymer manufactured in Experimental Example 6 was uniformly mixed with 46 g of KF-70 using a mechanical agitator and then put on a vacuum oven for 10 minutes at a temperature of 80° C. and a pressure of 10 torr so that bubbles were removed from the mixture and the temperature of the mixture became 80° C. 10 g of polyethylene glycol (having a molecular weight of 1000) was added into 30 g of MOCA, which had been previously adjusted to a temperature of 80° C., to form a liquid mixture. The liquid mixture was mixed with the mixture for 30 seconds at a rate of 3000 rpm using a mechanical agitator and then immediately poured into a mold. Then, gelling was performed for 30 minutes, and thereafter, curing was performed in an oven for 20 hours at 100° C. The cured product was taken out of the mold and cut to form a polishing layer of a polishing pad. A SEM photograph of the polishing layer is shown in FIG. 15. The polishing layer had a contact angle of 70 degrees, and open pores having an average diameter of 4-6 µm existed on a surface of the polishing layer. The concentration of the pores was about 50-60/0.01 mm².

Experimental Example 14

The light transmissivity of the polishing layer (liquid material polishing layer) manufactured using a liquid material to form microelements in Experimental Example 10 was compared with that of the polishing layer (hollow polymer polishing layer) manufactured using a hollow polymer to form microelements according to a method disclosed in U.S. Pat. No. 5,587,362. Here, the thickness of samples of the liquid material polishing layer and the hollow polymer polishing layer was 2 mm, and a wavelength of 400-700 nm was used to measure the light transmissivity. While the light transmissivity of the hollow polymer polishing layer was 17%, the light transmissivity of the liquid material polishing layer was 52%. Accordingly, it can be inferred that a polishing layer according to the present invention allows the flatness of an object being polished to be optically measured in situ without forming a separate transparent window.

A polishing pad according to the present invention contains embedded liquid microelements within a polymeric matrix so that micro open pores are uniformly distributed across a surface of the polishing pad. Accordingly, a polishing slurry can be uniformly collected and supplied so that an object being polished can be uniformly polished. Thus, a polishing operation can be performed at high precision. In addition, when the surface of the polishing pad is abraded by the polishing operation, the embedded liquid microelements are exposed on the surface and continuously provide open pores so that the polishing pad shows constant polishing performance during chemical mechanical planarization/polishing (CMP). Since the surface of the polishing pad containing the embedded liquid microelements does not contain polymeric microelement having high hardness, a surface of a wafer is not scratched. And the surface of the polishing pad is uniformly worn away so that the polishing pad can be stably used. Since the polishing pad containing the embedded liquid microelements is semitransparent to light used to detect the state of a surface being polished, the flatness of the surface being polished can be easily detected in situ during a polishing operation.

Moreover, the present invention uses a liquid material to manufacture a polishing pad, thereby having superior workability to a conventional case using a polymeric powder material. A liquid material can be easily and uniformly mixed with a material for a polymeric matrix so that problems of a polymeric powder material not being properly dispersed, forming a lump of powder, and causing scratches on a wafer are eliminated. The size and distribution of pores on the surface of the polishing pad can be variously adjusted using the weight ratio of a liquid material, the type and weight ratio of dispersing agent, the hydrophilicity of a polymeric matrix, and addition of hollow polymeric microelements. Accordingly, a polishing pad can be easily manufactured to be suitable for collecting and supplying various types of polishing slurries and for polishing objects being polished having various characteristics.

What is claimed is:

1. A method of manufacturing a polishing pad, the method comprising:
    mixing a material for a hydrophilic polymeric matrix with a liquid material;
    performing gelling and curing of the mixture, thereby forming a polishing layer comprising the polymeric matrix, liquid non-water soluble microelements embedded in the hydrophilic polymeric matrix, and pores defined by the embedded liquid non-water soluble microelements on its surface; and
    processing the polishing layer,
    wherein the liquid material includes at least one material selected from the group consisting of aliphatic mineral oil, aromatic mineral oil, silicon oil without a hydroxyl group in a molecule, soybean oil, coconut oil, palm oil, cotton seed oil, camellia oil, and hardened oil and the embedded liquid non-water soluble microelements are not removed during processing of the polishing layer.

2. The method of claim 1, wherein the mixing comprises mixing the liquid material with a dispersing agent.

3. The method of claim 2, wherein the content of the dispersing agent is 1-5 weight percent based on the total weight of the material for the polymeric matrix.

4. The method of claim 2, wherein the dispersing agent comprises at least one material selected from the group consisting of anionic surfactants such as higher alcohol sulfuric acid ester salt, higher alkyl ether sulfuric acid ester salt, sodium alkyl benzene sulfonate, α-olefin sulfonic acid salt, and phosphate ester salt; higher alkylamine type and quaternary ammonium type cationic surfactants; amino acid type and betaine type amphoteric surfactants; siloxane-oxyalkylene copolymer, polyoxyethylene polymer, polyoxyethylene-polyoxypropylene copolymer, glycerine fatty acid ester, sugar ester, and sorbitol fatty acid ester.

5. The method of claim 1, wherein the hydrophilic polymeric matrix is formed by introducing a hydrophilic compound into the material for the polymeric matrix through chemical bonding or mixing.

6. The method of claim 5, wherein the hydrophilic polymeric matrix contains 1-20 weight percent of the hydrophilic compound, based on the total weight of an isocyanate prepolymer.

7. The method of claim 5, wherein the hydrophilic compound comprises at least one material selected from the group consisting of polyethylene glycol, polyethylenepropylene glycol, polyoxyethylene alkylphenolether, polyoxyethylene alkylether, polyethylene glycol fatty acid ester, polyoxyethylene alkylamine ether, glycerine fatty acid ester, sugar fatty acid ester, and sorbitol fatty acid ester.

8. The method of claim 7, wherein the hydrophilic compound is polyethylene glycol having a molecular weight of 200-10000.

9. The method of claim 1, wherein the mixing comprises mixing a hollow polymer with the mixture.

10. The method of claim 9, wherein a ratio of the weight of the liquid material to the weight of the hollow polymer is 8.

11. The method of claim 1, wherein the liquid material is chemically incompatible with the material for the hydrophilic polymeric matrix.

12. The method of claim 1, wherein the molecular weight of the liquid material is in a range of 200-5000.

13. The method of claim 1, wherein the content of the liquid material is 20-50 weight percent based on the total weight of the material for the hydrophilic polymeric matrix.

* * * * *